United States Patent
Mayrhofer

(10) Patent No.: US 9,169,612 B2
(45) Date of Patent: Oct. 27, 2015

(54) ALPINE ANCHOR FOR ANCHORING THREADED RODS IN SOIL OR ROCK

(75) Inventor: Martin Mayrhofer, Linz (AT)

(73) Assignee: SPINNANKER GMBH, Brunn am Gebirge (AT)

(*) Notice: Subject to any disclaimer, the term of this patent is extended or adjusted under 35 U.S.C. 154(b) by 106 days.

(21) Appl. No.: 14/006,846

(22) PCT Filed: Mar. 23, 2012

(86) PCT No.: PCT/EP2012/001272
§ 371 (c)(1),
(2), (4) Date: Dec. 2, 2013

(87) PCT Pub. No.: WO2012/126629
PCT Pub. Date: Sep. 27, 2012

(65) Prior Publication Data
US 2014/0079492 A1  Mar. 20, 2014

(30) Foreign Application Priority Data
Mar. 23, 2011 (DE) .......................... 10 2011 014 880

(51) Int. Cl.
E21D 21/00 (2006.01)
E02D 5/80 (2006.01)
E02D 7/22 (2006.01)
F16B 43/02 (2006.01)

(52) U.S. Cl.
CPC *E02D 5/801* (2013.01); *E02D 7/22* (2013.01); *E21D 21/0086* (2013.01); *F16B 43/02* (2013.01)

(58) Field of Classification Search
CPC ...................................................... E21D 21/008
USPC ........ 405/258.1, 259.1, 302.1, 302.4; 173/29, 173/216, 171
See application file for complete search history.

(56) References Cited

U.S. PATENT DOCUMENTS

| | | | |
|---|---|---|---|
| 3,231,032 A * | 1/1966 | Genberg et al. ................ | 175/171 |
| 4,679,967 A * | 7/1987 | Hipkins et al. ................ | 405/288 |
| 4,960,348 A * | 10/1990 | Seegmiller ................ | 405/259.1 |
| 5,066,168 A | 11/1991 | Holdeman | |

FOREIGN PATENT DOCUMENTS

| AT | 8142 U2 | 2/2006 |
|---|---|---|
| DE | 202009000701 U1 | 6/2010 |
| EP | 1750020 B1 | 12/2008 |

* cited by examiner

*Primary Examiner* — Sean Andrish
(74) *Attorney, Agent, or Firm* — Browdy and Neimark, PLLC

(57) ABSTRACT

Alpine anchor for anchoring threaded rods in soil or rock, with a metal base plate having a number of threaded bores which are distributed about the circumference and into which the threaded rods can be screwed with an assembly machine, wherein at least one plug coupling is arranged between the stationary part and the base plate.

8 Claims, 14 Drawing Sheets

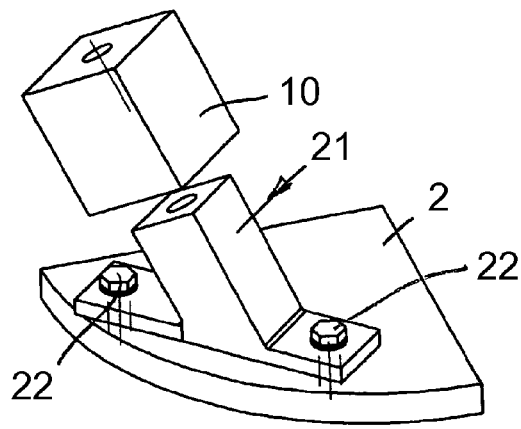
Fig. 12
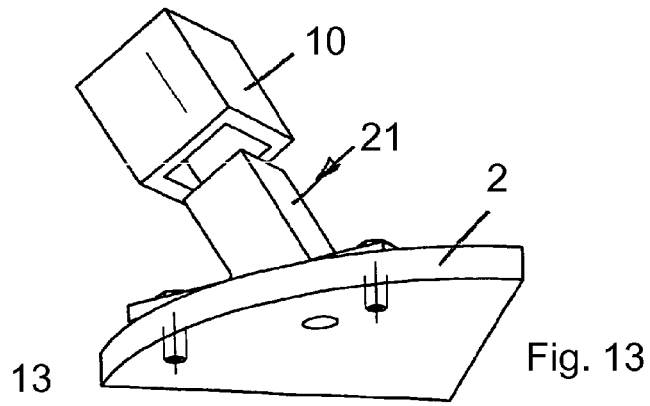
Fig. 13
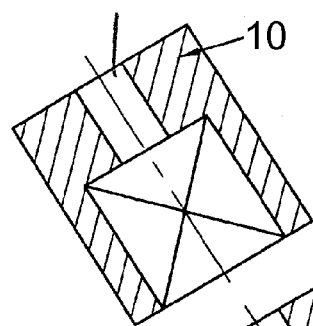
Fig. 14
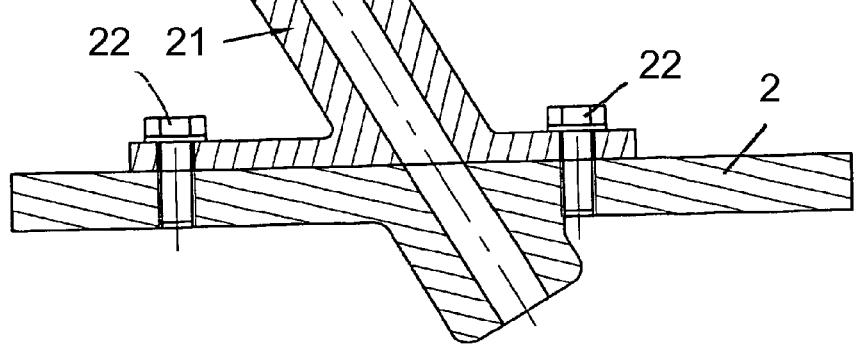

ALPINE ANCHOR FOR ANCHORING THREADED RODS IN SOIL OR ROCK

FIELD

The invention relates to an alpine anchor for anchoring threaded rods in soil or rock.

BACKGROUND

Such an alpine anchor has become known with the subject matter of EP 1 750 020 B1 by the same applicant, the anchor being termed spider-shaped anchor in said document.

It comprises substantially a base plate that is placed onto the soil or rock, and threaded rods to be driven through the base plate that are screwed through corresponding threaded bores in the base plate in different directions and at different angles, so as to be anchored in soil or rock likewise at different angles and in different directions.

An alpine anchor of this type has been widely successful. It has been found, however, that assembling the threaded rods into the base plate is difficult, because until now it was known only to use a certain type of drilling machine for the assembly. A known drilling machine of this type comprises a drive motor that drives a drill chuck in the form of a clamp chuck for rotation.

In using such a drilling machine for anchoring, it has been known to clamp the threaded rod by the rear end thereof into the drill chuck or clamp chuck and then position the front end of the threaded rod onto the threaded bore in the base plate and then turn on the drilling machine. Owing to the threaded rod being driven in rotation, the rod was thus progressively driven into the soil or rock, because the thread pitches disposed about the circumference thereof would pull the threaded rod into the soil.

It is a shortcoming of this known assembly method, however, that one must hold the drilling machine or assembly machine free-standing by hand to drive in a relatively long threaded rod with lengths of up to 6 meters. The standard dimension of the threaded rods used is a length of 2 to 4 m, with a threaded rod needing to be driven free-standing through the threaded bores of the base plate while the assembly machine is held unsupported. This presented a great risk of injury, because it could happen that the threaded rods were not clamped-in properly in the clamp chuck and would then be catapulted away during operation of the assembly machine, or it could also happen that the threaded rod would encounter resistance in the soil or rock while the threaded rods were being driven through the threaded bores in the base plate, and would shear off or become jammed, which made it difficult to hold the assembly machine in an accident-free manner.

SUMMARY

The invention is therefore based on the technical problem consisting of improving an alpine anchor of the kind mentioned at the beginning in such a way that a much safer assembly of threaded rods through the base plate of the alpine anchor is possible.

Additionally, the invention is based on the further technical problem consisting of proposing an assembly machine suited for this purpose and also a use of an assembly machine and providing a method for assembly of an alpine anchor of this type.

In order to solve this technical problem, the invention is characterized by the technical teaching of the independent claims.

With the novel solution, threaded rods having a length up to 12 m can be driven in without expenditure of effort by the operator while at the same time avoiding the risk of accidents.

The invention therefore generally claims any type of (releasable) pluggable coupling between a stationary molded part of an assembly machine fixed to the housing of the assembly machine, and the base plate of the alpine anchor.

It is therefore an essential feature of the invention that the alpine anchor has a base plate in which a plurality of threaded bores are disposed into which the threaded rods are screwable, and that on or in the base plate, in the vicinity of the threaded bores, molded receptacles are disposed for torque-proof engagement of the stationary part of the assembly machine, in which the assembly machine is anchorable in a torque-proof manner when the threaded rod is being screwed in. This is a first embodiment of the pluggable coupling being claimed.

These molded receptacles have the task of receiving in a torque-proof manner certain parts of the assembly machine that are fixed to the housing thereof, the parts that are fixed to the housing being referred to hereinbelow as molded parts. These molded parts are in the form of a tetragonal tube, for example, and are joined to the part of the assembly machine not driven in rotation, fixed to the housing of the assembly machine.

According to the invention it is now provided that, first, the assembly machine is coupled by the molded part disposed on the front end thereof, in a positive-locking coupling connection, to a molded receptacle disposed on or in the base plate, in order to thus achieve that the assembly machine is coupled by the front side thereof in a torque-proof manner to the top side of the base plate before the rotary drive is turned on.

It is particularly advantageous if the length and inclination of the molded part provided on the assembly machine is selected, with respect to the positive-locking engagement into the molded receptacle on the base plate, in such a way that the assembly machine on coupling in a torque-proof manner to the base plate, that is to say on plugging the molded part provided on the machine into the molded receptacle provided on the base plate, is freely supported and does not need to be manually protected against falling or tipping out.

In this way a particularly safe operation is achieved, since the assembly machine does not need to be supported with the physical strength of the human body against falling out or skewing, prior to and during the process of screwing the threaded rods into the base plate.

Screwing in the threaded rods takes place automatically, so to speak, because the advancement of the threaded rods is effected by the thread of the threaded rods engaging with the threaded bores in the base plate. The assembly machine thus merely serves to drive the threaded rods in rotation and does not need to generate any drilling pressure. It is therefore also not necessary to exert any hand-supported manual force onto the assembly machine in the axial direction of the threaded rods, because no manually applied drilling force is required.

Therefore, the molded receptacles disposed according to the invention on the base plate serve for torque-proof coupling to an associated counterpart (molded part) provided on the machine side that is disposed on the assembly machine.

This technical teaching creates the significant advantage that the base plate, owing to the molded receptacles that at least partially surround the threaded bores, is now suited for coupling in a torque-proof manner to the associated assembly machine.

For driving in the threaded rods, it is therefore provided that, first, the assembly machine is coupled in a torque-proof manner to the top side of the base plate in the region of the threaded bores, one threaded bore at a time, and that then the threaded rod is driven by means of the rotary drive of the assembly machine through the threaded sleeve in the base plate into the soil or rock. "Threaded sleeve" in this context refers to the threaded extension of the base plate.

It is not essential to the solution, however, that the threaded bore provided on the base-plate side is disposed in an extension formed onto the base plate. Providing the extension is advantageous merely because it provides for a long length of the female thread in the base plate.

In another embodiment, the extension can be eliminated and the threaded bore is disposed directly in the base plate, without any extension lengthening the length of thread engagement.

This creates the advantage that the assembly machine no longer needs to be held by the operator without support, but that instead the assembly machine is coupled in a torque-proof manner to the top side of the base plate of the alpine anchor prior to starting the assembly process, and then a threaded rod is inserted at the top end of the assembly head (as viewed from the operator's position) into an insertion opening disposed in the assembly head, and advanced there by hand until it is inserted into a driving bush driven for rotation in the assembly head.

This driving bush creates a frictional connection to the flat side of the threaded rod and drives the threaded rod for rotation.

When the rotary drive of the assembly machine is now turned on, the driving bush rotates and works its way along the thread of the threaded rod, such that same is driven downward in the direction of advancement through the threaded bore in the base plate so as to be driven into the soil or rock in a particularly safe and accident-proof manner.

Accordingly, it is no longer necessary to clamp the rear end of a threaded rod into the clamping chuck of an assembly machine that preferably takes the form of a drill, and to screw this threaded rod by hand without support through the threaded bore of the base plate. This type of assembly was performed in the prior art and meant a particularly accident-prone assembly method, in particular when an alpine anchor was to be assembled in open, steep terrain where there is only insufficient standing room for the operator.

The invention thus relates to any releasable coupling between an assembly machine and the associated threaded bore in the region of the base plate of the alpine anchor. This coupling is also termed pluggable coupling.

In the preferred embodiment, the positive-locking coupling is designed in the form of a molded receptacle that at least partially surrounds in or on the top side of the base plate each threaded bore of the base plate.

This molded receptacle can have either two or three (triangle), as desired, or more than three (e.g. quadrangle or pentagon) walls or stop surfaces adjoining one another at an angle that are suited for positive-locking contact with the mating surfaces of the molded part provided on the machine side. The positive-locking contact of the molded part provided on the machine side can take place in this configuration inside the walls or stop surfaces of the molded receptacle or also outside the walls or stop surfaces. Furthermore, a combination of inside contact and outside contact is possible as well.

The first-mentioned embodiment means that the molded part provided on the machine side comes to bear against the walls or stop surfaces of the molded receptacle provided on the base-plate side from the inside.

The latter embodiment means that the molded part provided on the machine side engages over the walls or stop surfaces of the molded receptacle provided on the base plate from outside in order to achieve the desired torque-proof form closure.

In a particularly simple embodiment, the molded receptacle provided on the base-plate side can be designed as an approximately tetragonal frame around the threaded bore molded into the base plate that projects out beyond the threaded bore in the style of a collar and forms with the longitudinal axis of the threaded bore an axial extension of the threaded bore in the molded cavity.

The molded part provided on the machine side is plugged into the molded cavity provided on the base-plate side, in order to thus create a releasable coupling connection between the housing of the assembly machine and the base plate of the alpine anchor.

In another embodiment of the invention, it may be provided that the molded receptacles that at least partially surround the threaded bores are disposed not as circumferential frames raised above the surface of the base plate, but instead are formed as depressions in the base plate.

It is therefore important only that a positive-locking connection exists between a part fixed to the housing of the assembly machine and the associated top side of the base plate.

Instead of a tetragonal cavity and an associated tetragonal molded receptacle in the base plate, it is also possible, of course, to use any other coupling elements. For example, hexagonal, oval, triangular or other molded receptacles can be disposed on or in the base plate, that cooperate in a positive-locking manner with molded parts of the same shape provided on the assembly machine and provide the desired rotational coupling.

A molded receptacle of this type can also be created by lock pins that engage into associated lock-pin receptacles in the mating part.

In a preferred embodiment, the lock pins are disposed on the assembly machine and engage into associated lock-pin receptacles in the form of bores provided in or on the base plate.

Therefore, all of the described positive-locking connections are capable of transmitting high torques, and it is therefore no longer necessary—as it is known in the prior art—to hold the assembly machine using only one's hands, in order to absorb by one's physical strength the relatively high torque transmitted to the assembly machine by the threaded rod being screwed in.

In lieu of an afore-described positive-locking pluggable coupling between the base plate and the assembly machine provided on the housing side it is also possible, however, to use other pluggable couplings, such as for example Bayonet couplings or screw couplings.

In one embodiment of the inventive concept according to the subject matter of an independent claim, it is further provided that the assembly machine no longer has the design of a simple drilling machine, but instead comprises an assembly head that is driven via a reduction gear and in which a spin chuck is disposed that is driven for rotation which is connectable in a positive-locking manner to the threaded rod.

The threaded rod is inserted in this configuration via an insertion opening disposed on the assembly head, into a driving bush that is driven for rotation in the assembly head, which driving bush is driven for rotation and drives the threaded rod for rotation into the longitudinal direction.

It is known in this context to provide the threaded rods with flattened areas on opposite sides, such that the thread pitches are disposed about the outer circumference of the threaded rod only outside each flattened area.

In this manner it is possible to insert the threaded rod into the rotationally driven driving bush that is matched to the afore-described shape of the threaded rod, and to create there the frictional connection to the flat sides of the threaded rod, after which the driving bush is then driven for rotation and the threaded rod is screwed from the top down through the insertion opening disposed in the assembly head, through the threaded bore in the base plate, and driven with the front tip thereof into the soil or rock. Advancing the threaded rod, however, is effected by engagement of the threaded rod into the threaded bore provided on the base-plate side. It is not necessary to exert manual force onto the assembly machine in order to generate an advancement of the threaded rod.

Primarily, the coupling should be a torque-transmitting coupling that is positive-locking.

In another embodiment, it may be provided that this coupling additionally also secures the assembly machine on the base plate against lifting off in the longitudinal direction of the threaded rod. For this purpose, the pluggable couplings described here may be equipped with an additional locking mechanism to prevent the assembly machine from lifting out of the molded receptacle provided on the base plate side. Such a connection locking device can be in the form of a spring-loaded ball lock or a compression coupling. In addition to the properties of a pluggable coupling, the enhancement of the pluggable coupling by means of a lockable or clampable connection locking device is therefore claimed as well.

A method for assembly of an alpine anchor by means of an assembly machine according to an independent claim provides that the threaded rod is driven by means of the assembly machine which is coupled in a torque-proof manner to the base plate, through the threaded sleeve in the base plate into the soil or rock.

This means that, during assembly of the threaded rods, the assembly machine is coupled to the base plate in a torque-proof manner and turned on only after that, and in this state the threaded rods are driven by means of the rotary drive of the assembly machine through the threaded bores in the base plate into the soil or rock.

In a first method step, the threaded rod to be assembled is therefore inserted into an insertion opening at the rear of the assembly head and guided into the region of the driving bush disposed in the assembly head.

In a second method step, the threaded rod then moves into positive-locking engagement with the driving bush, and in a third method step the molded part disposed on the front of the assembly machine is brought into positive-locking engagement with the molded receptacle on the base plate, the assembly machine being placed onto the top side of the base plate in the process. In a fourth method step, the drive motor of the drive unit is started, and the threaded rod is driven by means of the assembly machine that is coupled in a torque-proof manner to the base plate, through the threaded sleeve in the base plate into the soil or rock.

The subject matter of the present invention derives not only from the subject matter of the individual claims but also from the individual claims taken in combination with each other.

All of the details and features disclosed in the documents, including in the Abstract, and in particular the physical form illustrated in the drawings, are claimed as essential to the invention in so far as they are novel, whether separately or in combination, with respect to the prior art.

BRIEF DESCRIPTION OF THE DRAWINGS

The invention will now be described in detail with reference to a drawing illustrating just one way of carrying out the invention. Further features essential to the invention and advantages of the invention will be apparent from the drawings and from their description.

In the drawings,

FIG. 12 shows a perspective view of a further embodiment, FIG. 13 shows the same view as FIG. 12, FIG. 14 shows a section through the configuration according to FIGS. 12 and 13.

DETAILED DESCRIPTION

Figure 1:
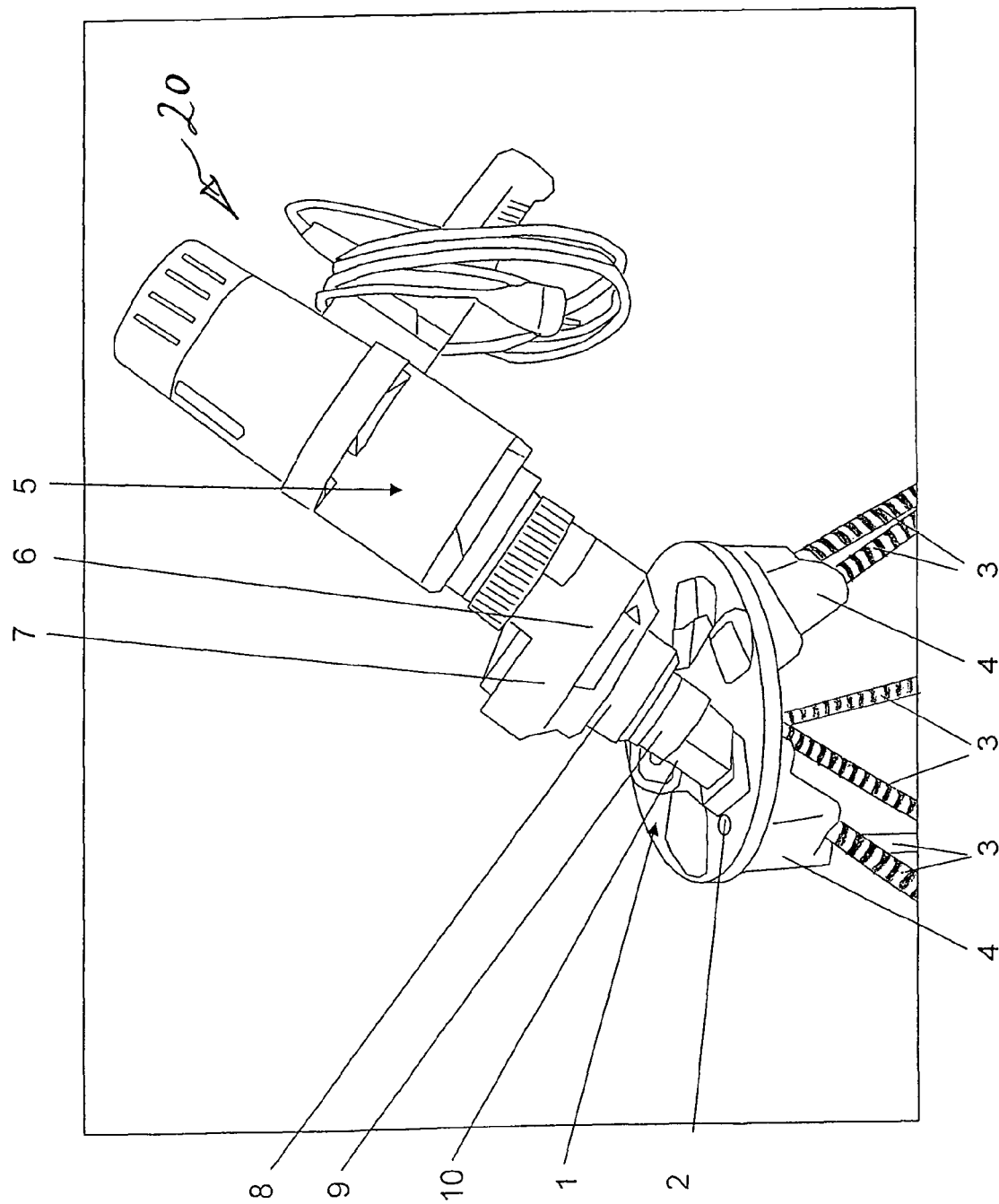
FIG. 1 shows a perspective view of an alpine anchor with an assembly machine placed onto same for assembly of the threaded rods.
Figure 2:
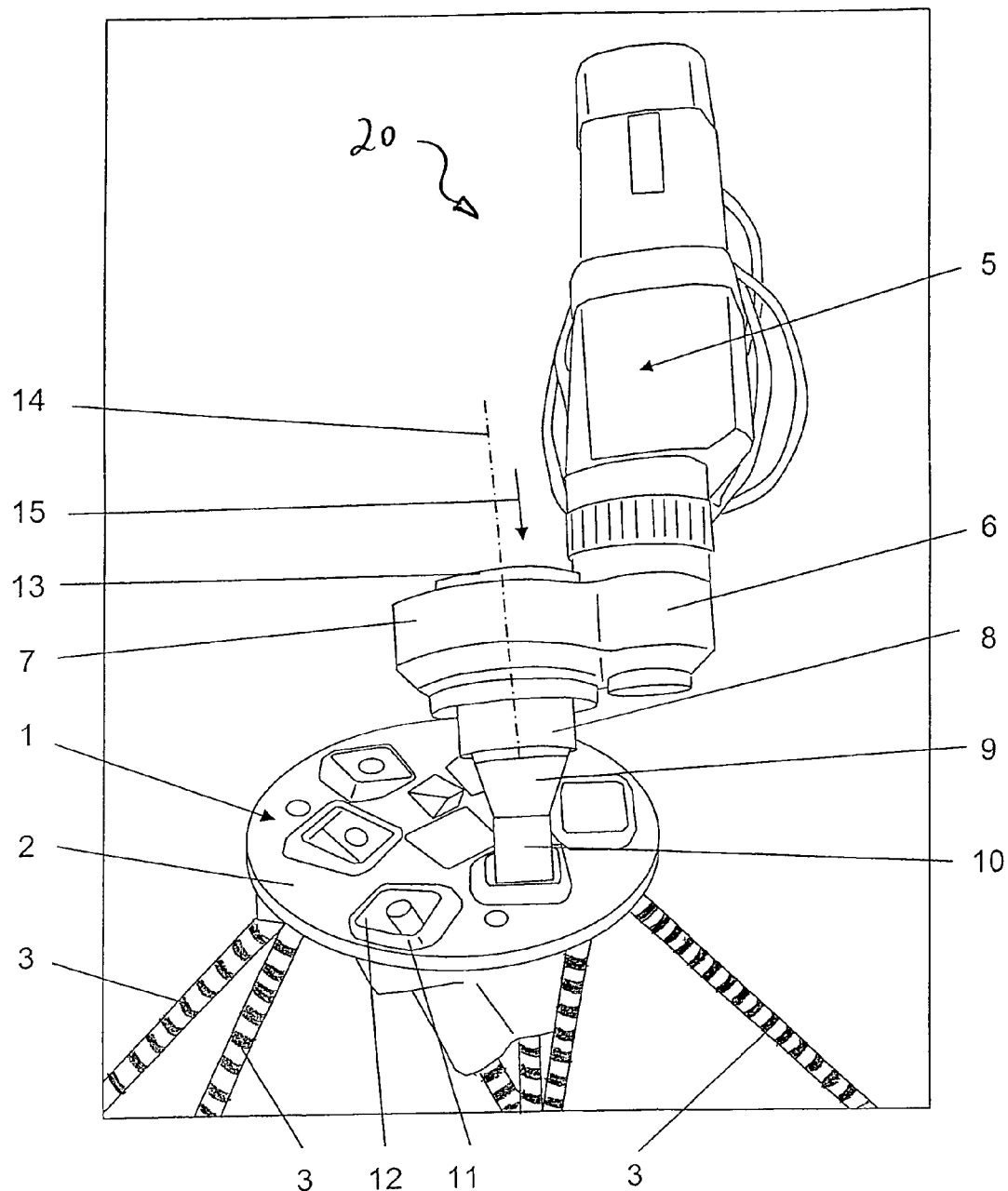
FIG. 2 shows an illustration similar to FIG. 1, in a different view.
Figure 3:
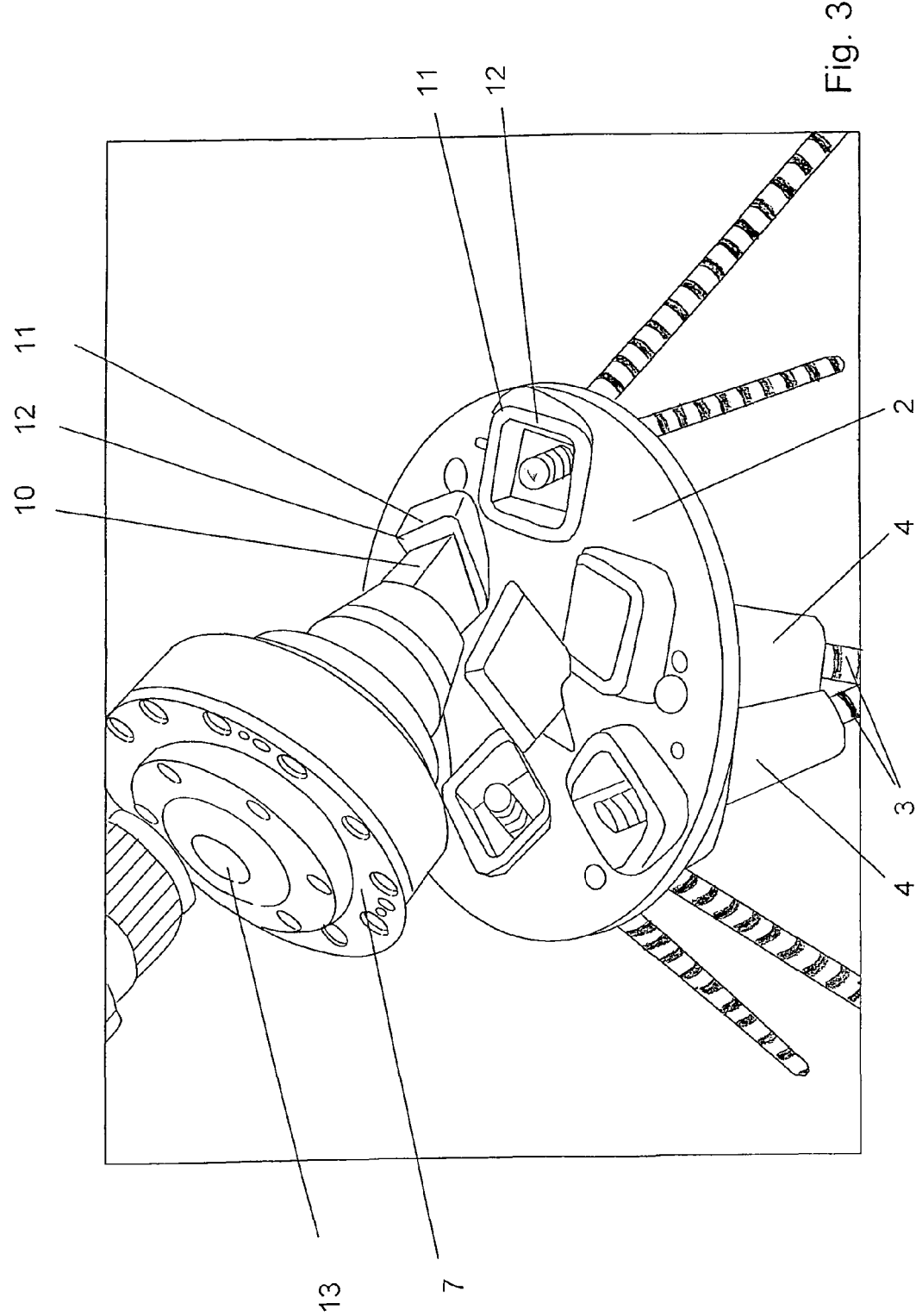
FIG. 3 is an enlarged depiction of the assembly position of FIGS. 1 and 2.

According to FIGS. 1 to 3, the alpine anchor 1 comprises a base plate 2 made of a metal material, preferably a cast material, having a plurality of threaded bores 16 obliquely penetrating the base plate 2. The threaded bores 16 are formed in the region of threaded sleeves 4 that are integrally molded in the casing material of the base plate into the underside of the base plate 2. The threaded sleeves 4 are therefore fabricated as cast-on extension pieces or extensions formed onto the underside of the base plate 2. A plurality of threaded rods 3 are to be screwed through the threaded bores 16 of the base plate 2, the external thread of each threaded rod 3 being in thread engagement with the threaded bore 16 in the region of the threaded sleeve 4.

In order to drive in the threaded rods 3, a drive unit 5 is used that has a drive motor, the drive shaft of which is connected to a reduction gear 6 in the form of a bevel gear system and drives a spin chuck 8 disposed in an assembly head 7, the spin chuck 8 comprising a driving bush 9 driven for rotation, the shape of which matches the shape (round and flattened on both sides) of the threaded rod 3. The threaded rod 3 is provided with a thread extending about the outer circumference thereof.

As can be seen from FIG. 3, an insertion opening 13 which is suited for receiving the front end of a threaded rod 3 is disposed on the top side of the assembly head 7. The threaded rod is inserted in the direction of arrow 15 in the direction of the longitudinal axis 14 with the tip thereof pointing downward, into the insertion opening 13, and inserted by hand into the assembly head 7 until the external thread of the threaded rod 3 is in torque-proof interlocking engagement with the driving bush 9 in the spin chuck 8.

The threaded rod 3 then projects out from the driving bush 9 and engages with and extends through a molded part 10 that is fixed to the housing of the drive unit 5.

In this assembly position, the drive unit 5 is now placed onto the top side of the base plate 2, as shown in FIGS. 1 to 3, such that the molded part 10 provided on the machine side moves into positive-locking engagement with one molded receptacle 11 at a time on the top side of the base plate 2. This creates the pluggable connection between the assembly machine 20 and the base plate 2, 2a.

This is shown in greater detail in FIGS. 4 to 7.

In a first embodiment, each threaded bore 16 in the base plate 2 is disposed recessed and terminates at the top side in a molded cavity 12 which, in turn, is surrounded by an approximately tetragonal molded receptacle 11 extending about the circumference on three sides. This recessed configuration of the molded cavity 12 creates the advantage of a low height of the base plate 2 because the part on the base-plate side that forms one part of the pluggable connection is molded into the cavity below the top side of the base plate 2.

The upper part of the molded receptacle 11 is molded onto the base plate 2 raised above the top side thereof and forms a two- or three-sided collar. It is also possible, however, to provide a collar bounded by four sides.

In a further embodiment, the molded receptacle 11 can be designed recessed into the base plate 2 in the form of two or three or four slots that are connected to one another.

The shape of the molded receptacle 11 must substantially match the shape of the molded part 10 of the assembly machine to be brought into torque-proof engagement there. The intent is therefore to achieve a form closure between the inner circumference of the molded receptacle 11 and the outer circumference of the molded part 10 provided on the machine side.

The molded part 10 disposed on the machine side is shaped such that the molded part 10 engages in a positive-locking manner into and extends through the molded receptacle 11 and comes to bear in a positive-locking manner against the walls of the molded cavity 12 of the base plate 2.

In this manner a torque-proof coupling connection is created between the housing of the drive unit 5 and the respective base plate 2.

All that is required now is for the part of the threaded rod that protrudes out from the front of the driving bush 9 to be placed onto the threaded bore 16 in the base plate 2, after which the drive unit 5 is turned on. The threaded rod 3 is thus screwed by rotation from the rear to the front in the direction of arrow 15 through the threaded bore 6 in the base plate 2, and in the course of the rotation automatically drives itself with the tip thereof into the soil or rock. The advancement is generated by the thread lead of the threaded sleeve in the base plate over the external thread on the threaded rod 3.

Any counter-acting torques are absorbed by the positive-locking (pluggable) coupling between the base plate 2 and the drive unit 5, because the molded part 10 of the drive unit 5 provided on the machine side is in positive-locking engagement with the respective molded receptacle 11 of the base plate 2.

Figure 4:
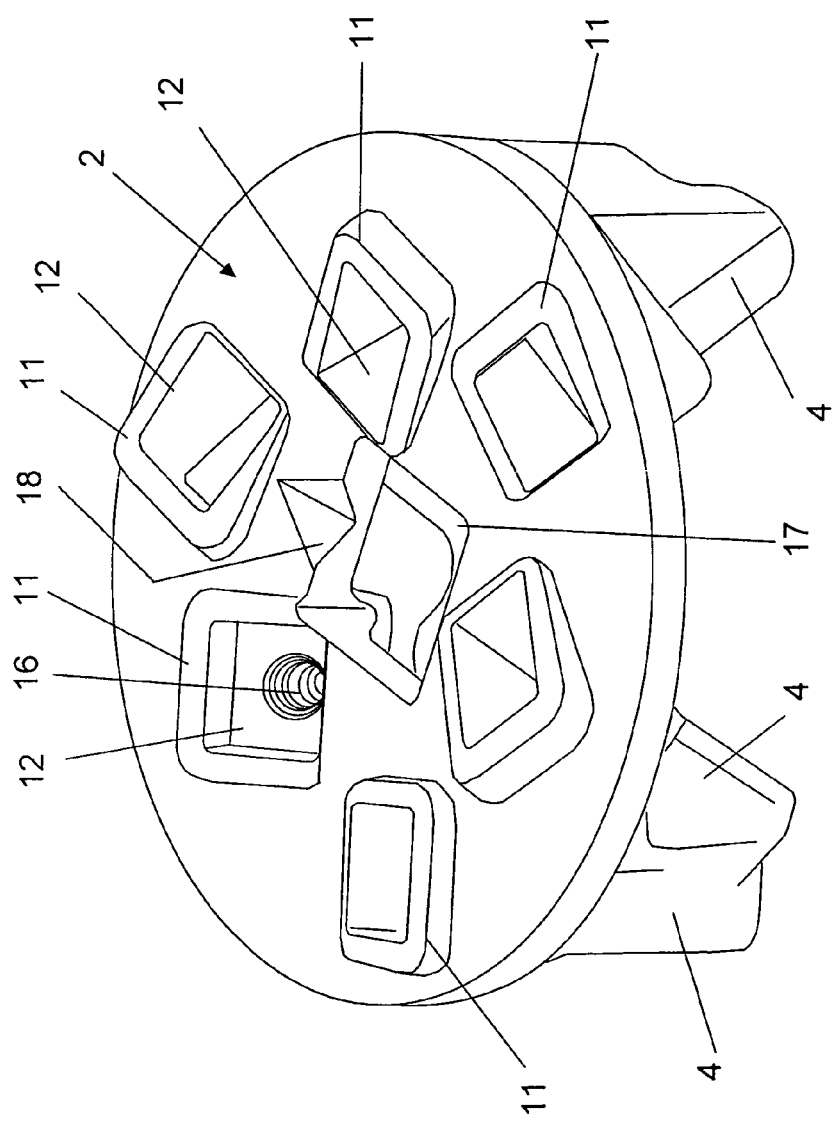
FIG. 4 shows a perspective view of a first embodiment of a base plate of an alpine anchor.
Figure 5:
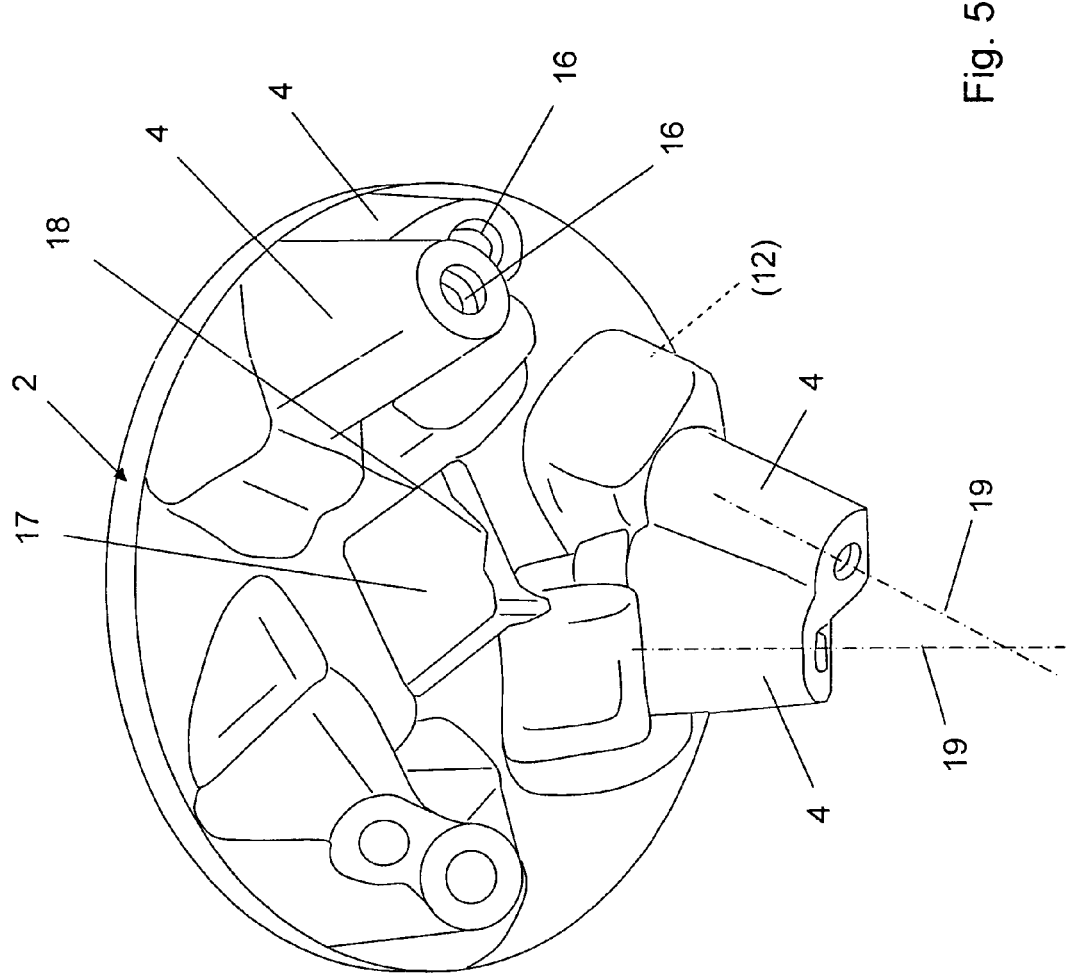
FIG. 5 shows a bottom view of the base plate of the alpine anchor of FIG. 4.

FIGS. 4 to 5 show a smaller embodiment of a base plate 2, in which only six different threaded bores 16 with the associated molded receptacles 11 and molded cavities 12 are shown.

Each threaded bore 16 is downwardly elongated in the region of a threaded sleeve 4 which is materially integrally formed on the underside of the base plate 2, these threaded sleeves 4 becoming buried in the soil or rock as well and permitting a torque-proof connection between the base plate and the surrounding soil.

It is also important that the pitch of threaded sleeves 4 that have threaded bores worked into same and are disposed side by side in pairs is selected such that the screw-in directions 19 of adjacent threaded rods 3 cross, as shown in FIG. 5.

Such crossing threaded rods are also shown in the drawings of FIGS. 1 to 3.

Figure 6:
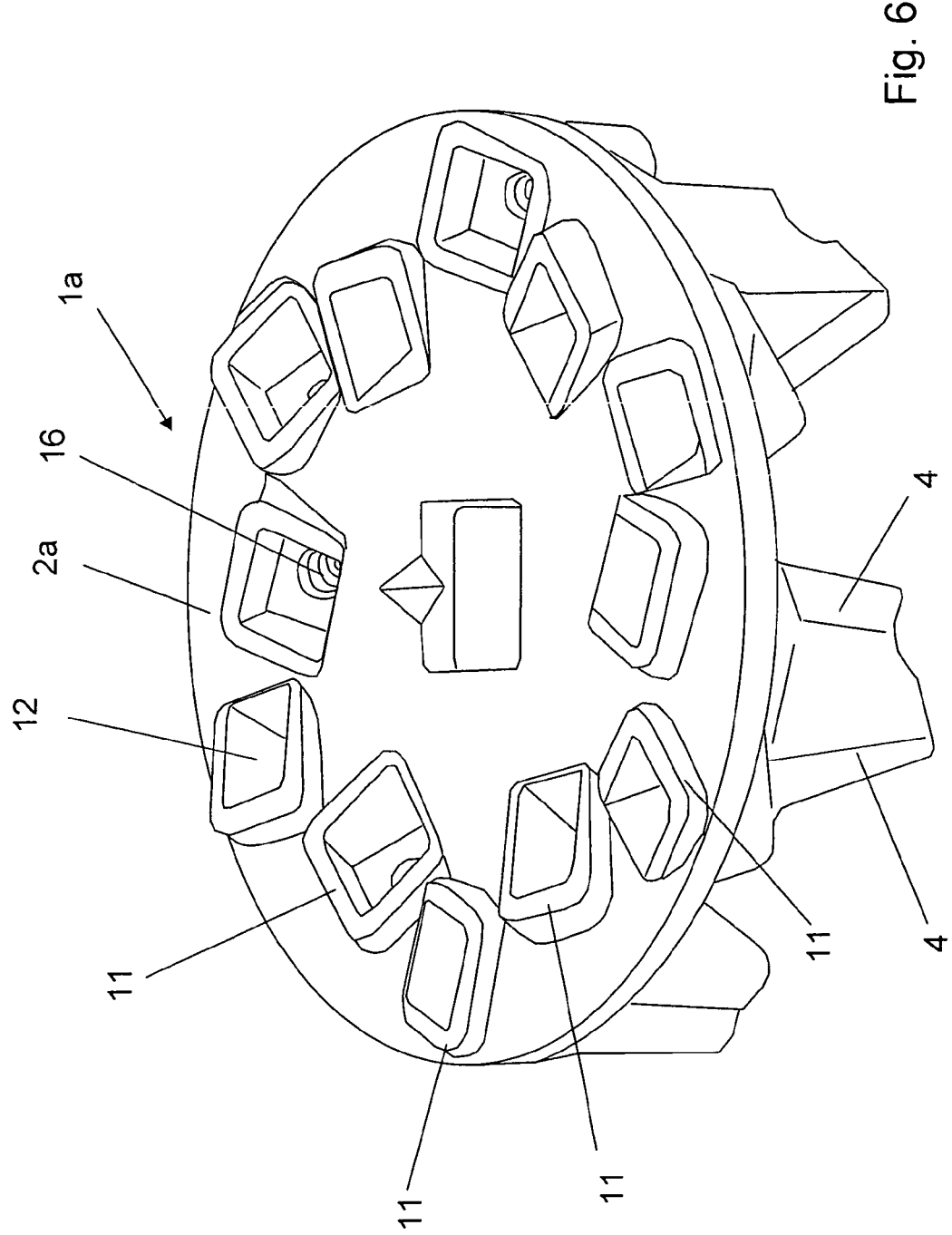
FIG. 6 shows a second embodiment of a base plate of an alpine anchor.
Figure 7:
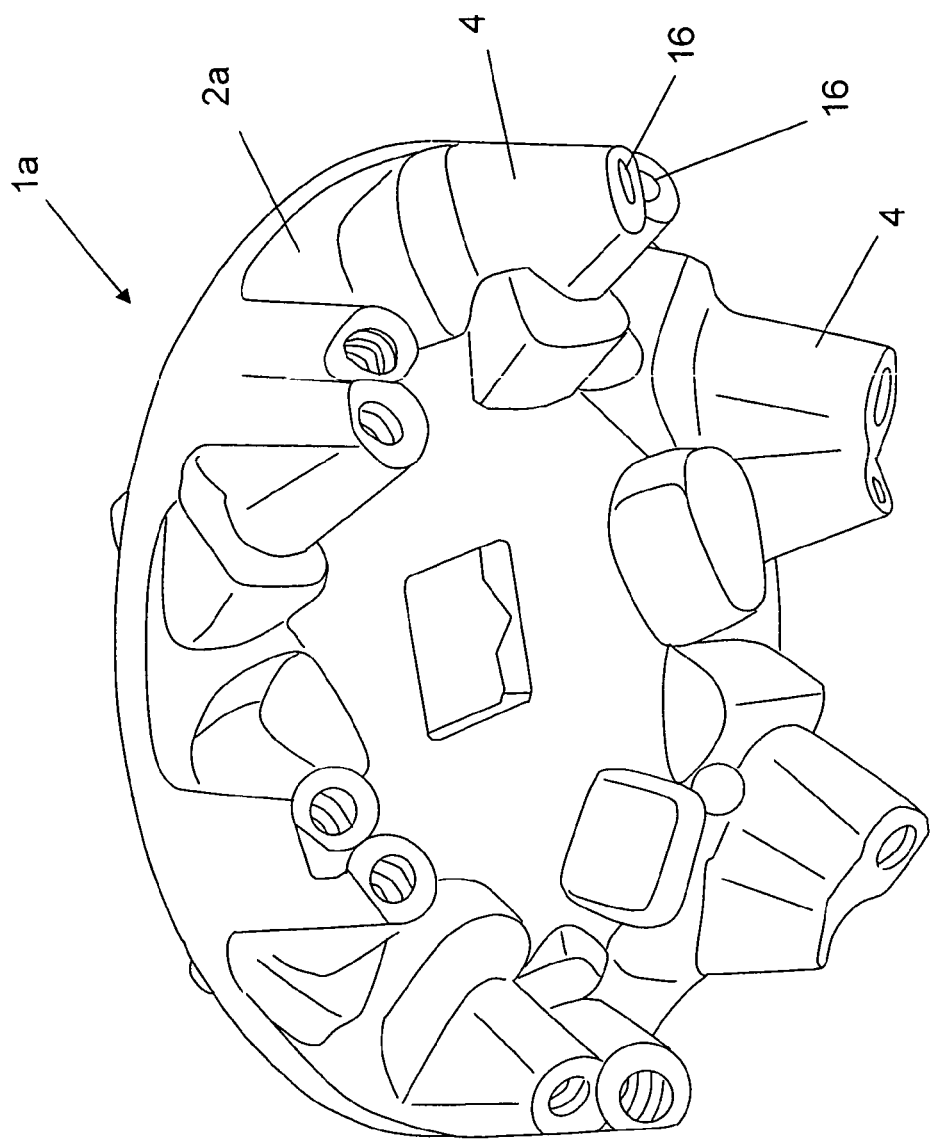
FIG. 7 shows a perspective bottom view of the alpine anchor of FIG. 6.

Both the base plate 2 according to FIGS. 4 to 5 and the larger-size base plate 2a according to FIGS. 6 to 7 each bear a central cavity 17 designed in the form of a tetragon or polygon, in which central cavity 17 a lateral guide groove 18 is formed.

In this central cavity 17 of the base plate 2, upwardly projecting items, such as e.g. poles, receptacles or other assembly parts may then be arranged that become centered in the central cavity 17.

It is also possible to equip the base plate 2, 2a with other threaded bores not shown in the drawing, with which it is possible to fasten to the top side of the base plate 2, 2a any desired connecting parts or fasteners.

The larger base plate 2a according to FIGS. 6 and 7 bears a total of 12 threaded bores that are each arranged at an angle to one another, wherein threaded bores 16 arranged in pairs are combined in each case in threaded sleeves that converge in pairs and are molded onto the underside of the base plate 2, 2a and form a materially integral part therewith.

It is not essential to the solution, of course, that the molded receptacles 11 shown in FIGS. 4 to 7 that bound the threaded bores 16 are designed raised above the surface of the base plate 2, 2a.

They may also be disposed as countersunk polygonal or tetragonal cavities countersunk into the surface of the base plate 2.

The further drawings show that, irrespective of the shape of the pluggable coupling, it must be ensured only that a torque-proof pluggable connection between the assembly machine 20 and the molded receptacles on the base plate 2 is ensured.

Figure 8:
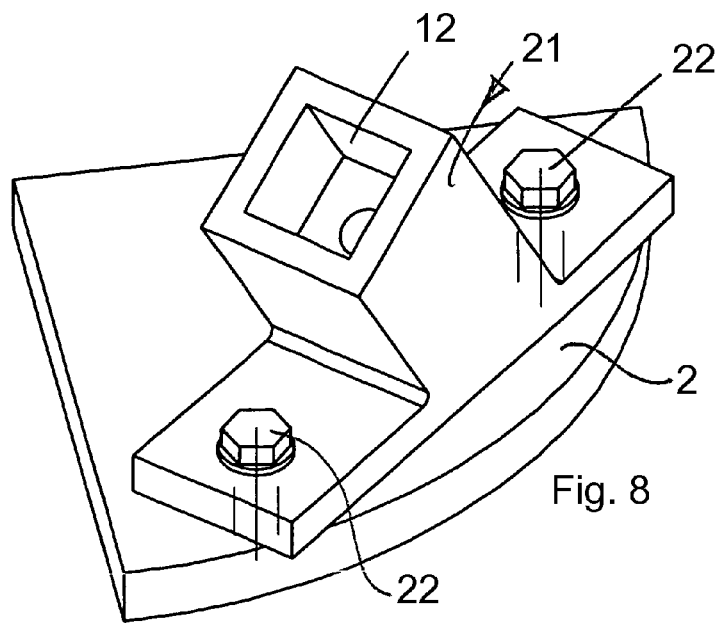
FIG. 8 shows a perspective view of a further embodiment of a molded receptacle.
Figure 9:
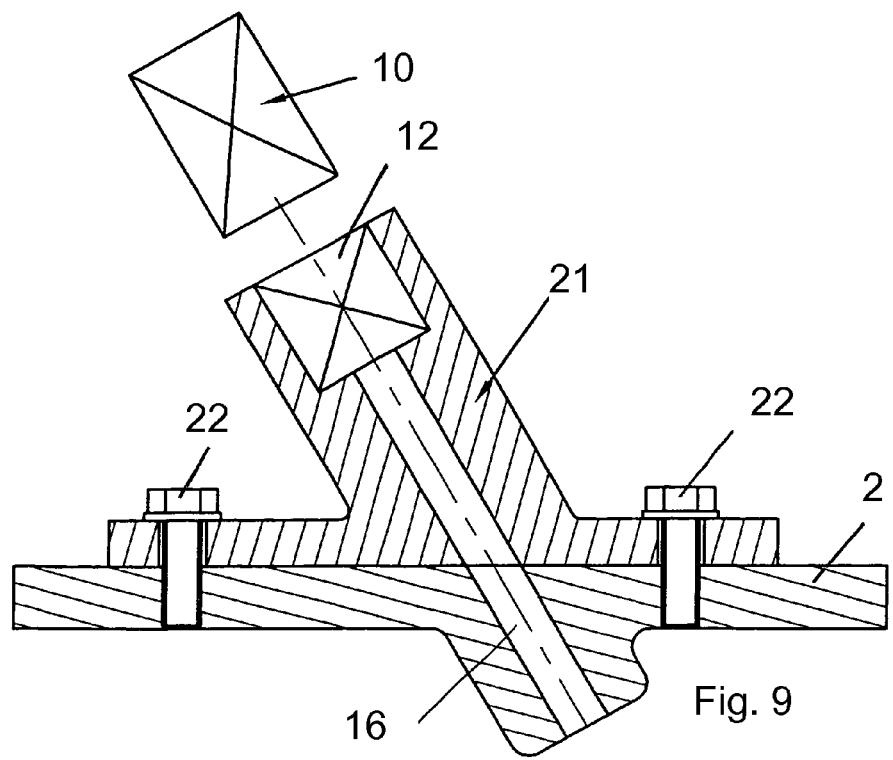
FIG. 9 shows a section through the configuration of FIG. 8.

Thus, FIGS. 8 and 9 show another embodiment of a molded receptacle 21 that is fastened as a separate part with the aid of screws 22 on the top side of the base plate 2. The molded cavity 12 is disposed on the upper end of the molded receptacle 21, the molded part 10 provided on the machine side engaging into the molded cavity 12 in the style of a pluggable coupling and being held in a torque-proof manner.

Figure 10:
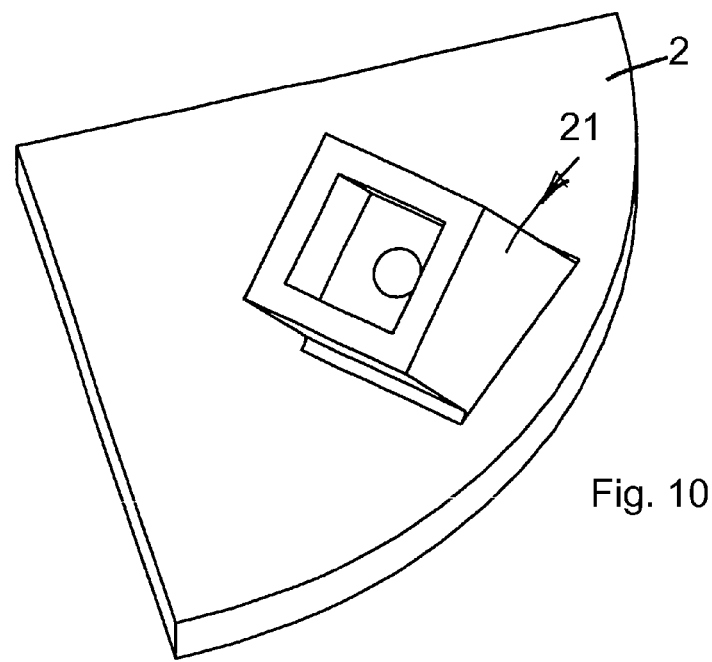
FIG. 10 shows a perspective view of an embodiment that has been modified from FIG. 8.
Figure 11:
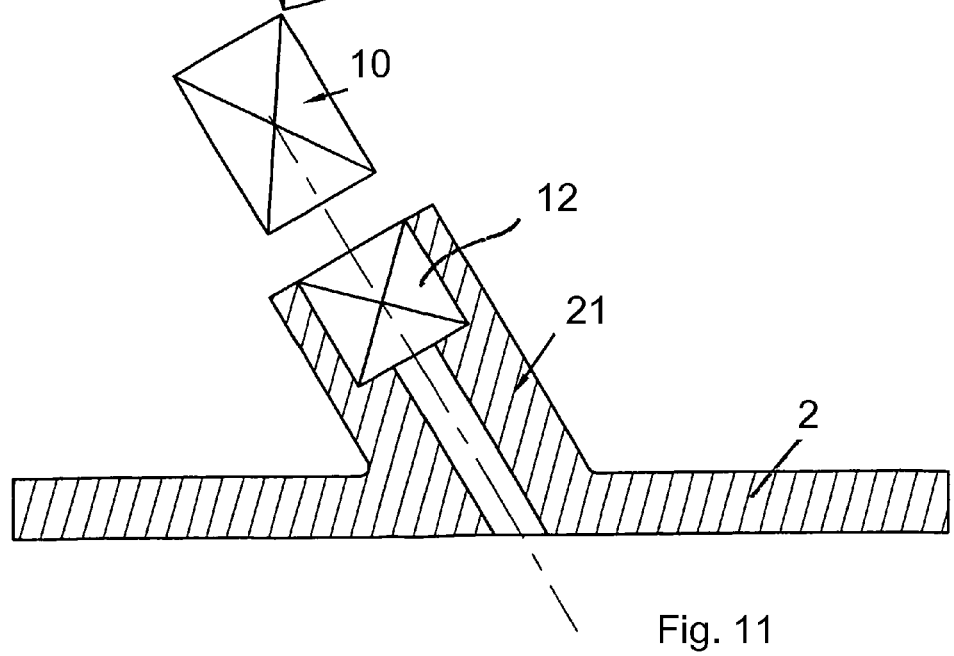
FIG. 11 shows a section through the configuration according to FIG. 10.
Figure 15:
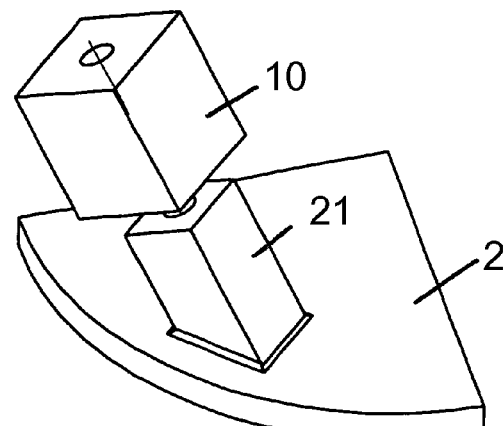
FIG. 15 shows a perspective view of an embodiment that has been modified from FIG. 12.
Figure 16:
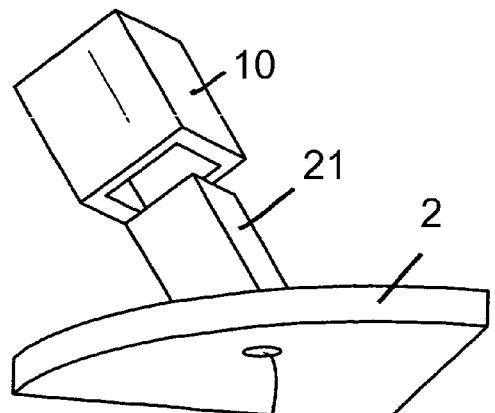
FIG. 16 shows a perspective view according to FIG. 15.
Figure 17:
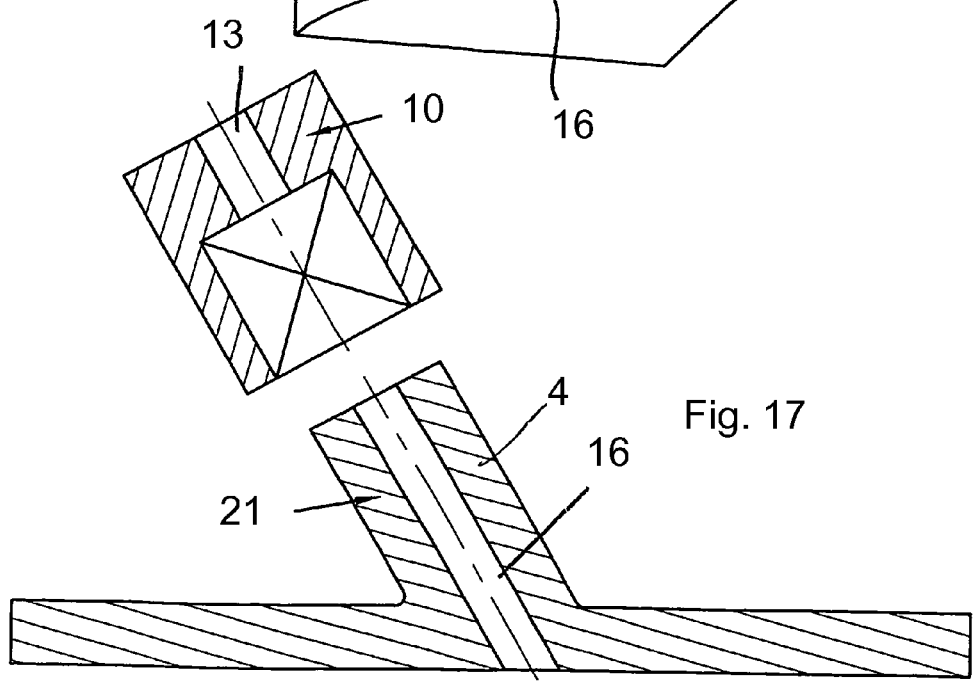
FIG. 17 shows a section through the configuration according to FIGS. 15 and 16.
Figure 18:
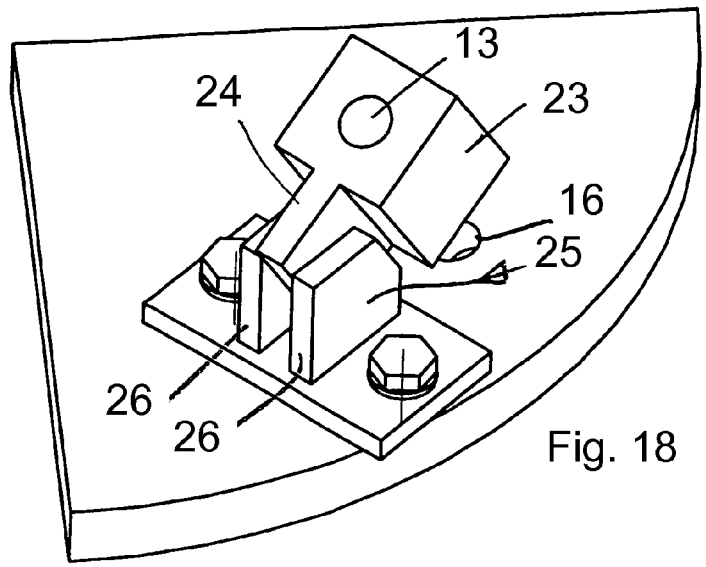
FIG. 18 shows a perspective view of a further embodiment for a pluggable coupling.
Figure 19:
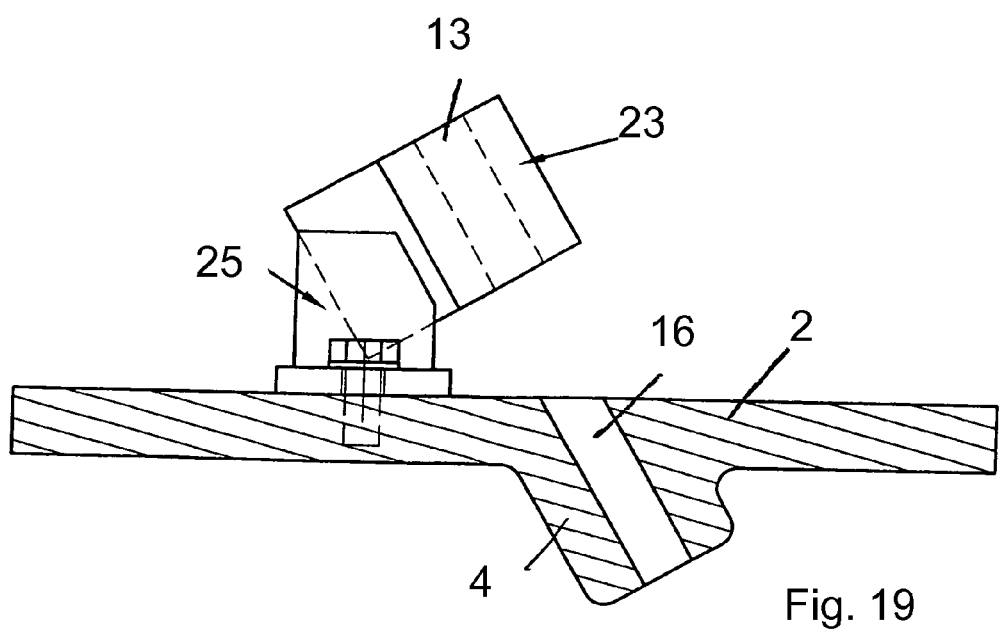
FIG. 19 shows a section through the configuration of FIG. 18.

FIGS. 10 and 11 show that the molded receptacle 21 that is shown as a separate piece in FIGS. 8 and 9 can also be joined materially integrally directly to the base plate 2.

In contrast to the exemplary embodiment according to FIGS. 8 to 11, FIGS. 12 to 17 show that a pluggable coupling can also be formed in such a way that the molded part 10 on the machine side engages over the molded receptacle 21 on the base-plate side and is connectable to same in a torque-proof manner in the style of a pluggable coupling.

FIGS. 18 to 21 show a further embodiment of a pluggable coupling. Here it can be seen that a molded part 23 is fixed on the machine side, which molded part 23 has at least one lateral projection 24 that is insertable into an associated molded receptacle provided on the base-plate side. The molded receptacle 25 on the base-plate side is designed in the form of 2 projections 26 disposed in parallel and spaced apart that form between them a space into which the projection 24 provided on the machine side engages.

Figure 20:
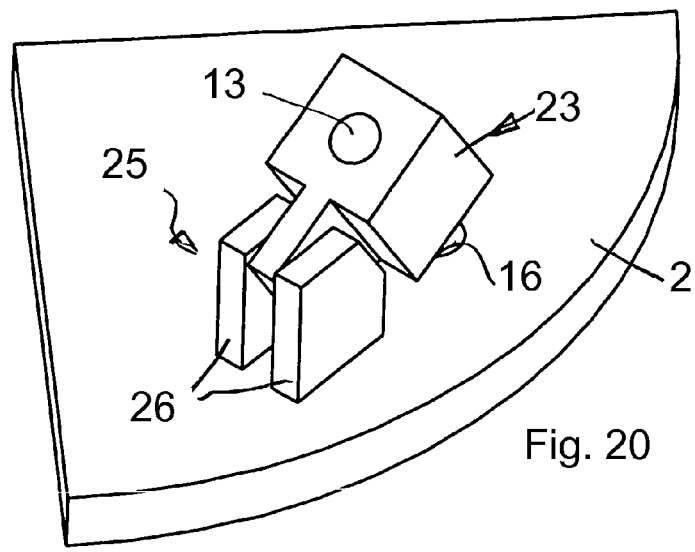
FIG. 20 shows an embodiment that has been modified from FIG. 12.
Figure 21:
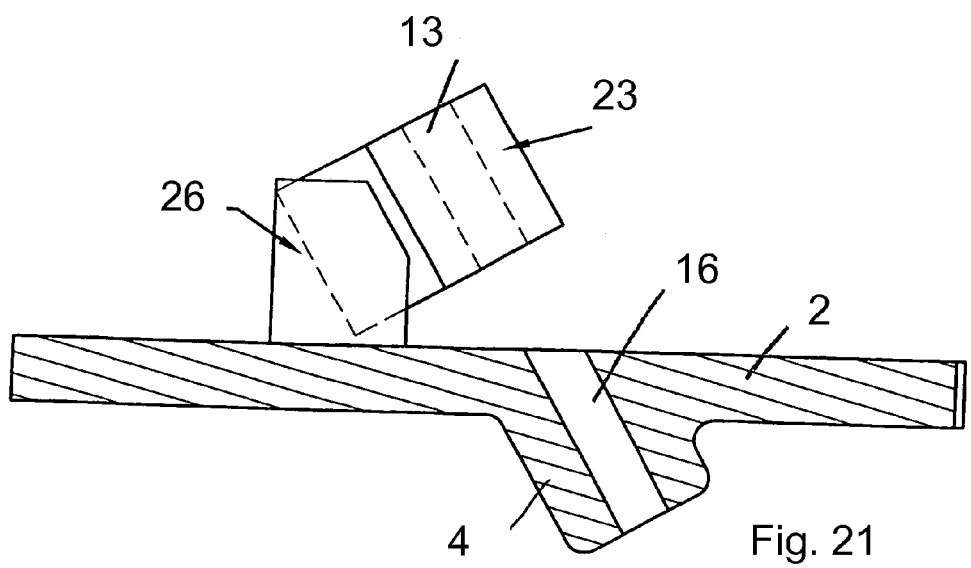
FIG. 21 shows a section through the embodiment of FIG. 20.

FIGS. 20 and 21 show that the molded receptacle 25 provided on the base-plate side can also be formed materially integrally directly with the base plate itself.

Furthermore, it can be seen in all of the embodiments that the insertion opening 13 in the molded part 10, 23, 27 disposed on the machine side must be flush with the threaded bore 16 provided on the base-plate side, because the threaded rod 3 engages with and extends through both bores 13, 16.

Figure 22:
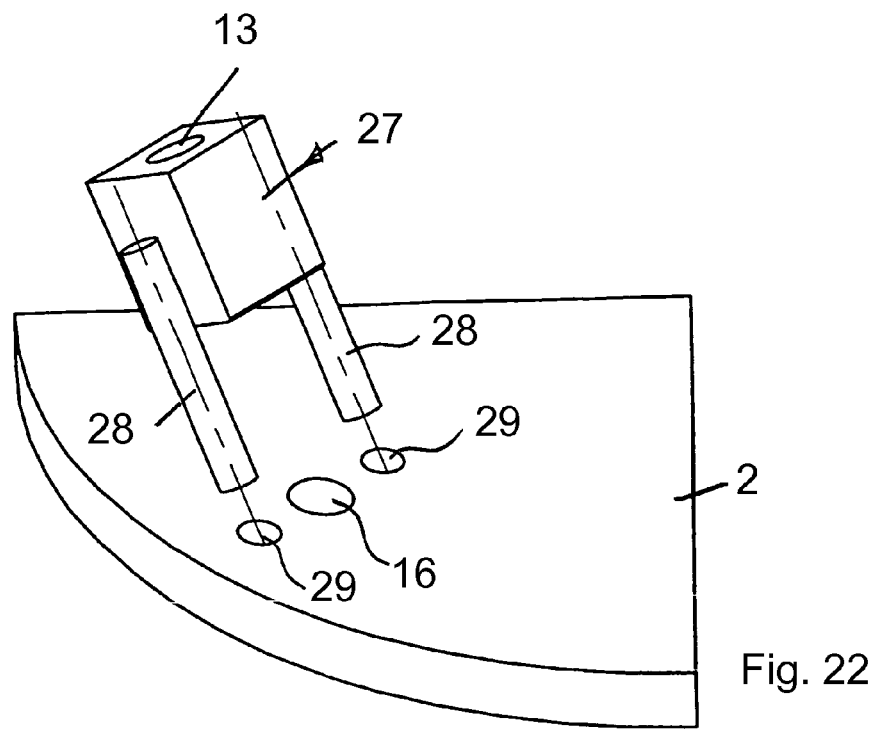
FIG. 22 shows a perspective view of a further embodiment of a pluggable coupling.
Figure 23:
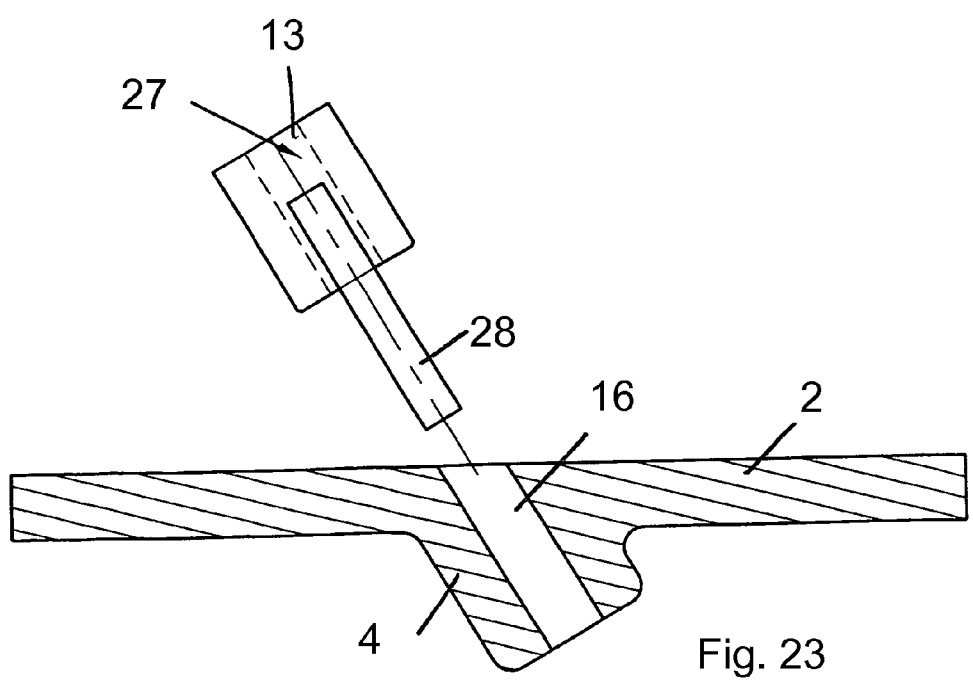
FIG. 23 shows a section through the embodiment of FIG. 22.

FIGS. 22 and 23 show as a further embodiment that at least 2 journals 28 are disposed on the molded part 27 provided on the machine side that engage into associated bores 29 provided on the base plate in order to create the torque-proof pluggable connection. The kinematic reversal is also possible of course, in which the journals 28 are molded onto the base plate 2 and engage into associated receiving bores 29 in the region of the molded part 27 on the machine side.

LIST OF REFERENCE NUMERALS 1 alpine anchor
2 base plate 2a
3 threaded rod
4 threaded sleeve
5 drive unit
6 reducing gear
7 assembly head
8 spin chuck
9 driving bush
10 molded part
11 molded receptacle
12 molded cavity
13 insertion opening
14 longitudinal axis
15 direction of arrow
16 threaded bore
17 central cavity
18 guide slot
19 screw-in direction
20 assembly machine
21 molded receptacle
22 screw
23 molded part
24 projection (of 23)
25 molded receptacle
26 projection (of 25)
27 molded part
28 journal
29 bore

The invention claimed is:

1. An alpine anchor system comprising an alpine anchor for anchoring threaded rods in soil or rock and an assembly machine, the alpine anchor having a base plate made of metal, the base plate comprising a plurality of threaded bores distributed about the circumference of the base plate into which the threaded rods are screwable by the assembly machine, wherein at least one pluggable coupling is disposed between a stationary part of the assembly machine and the base plate, and wherein the at least one pluggable coupling comprises molded receptacles for torque-proof engagement of the stationary part of the assembly machine, the molded receptacles are provided on or in the base plate in the vicinity of the threaded bores, wherein the stationary part of the assembly machine is formed to be plugged into any of the molded receptacles in a torque-proof manner while a respective threaded rod is being screwed in the respective threaded bore.

2. The alpine anchor system according to claim 1, wherein the molded receptacles are provided in or on a side of the base plate for torque-proof engagement for the stationary part of the assembly machine and the molded receptacles at least partially surround the threaded bores for threaded engagement of the threaded rods.

3. The alpine anchor system according to claim 1, wherein the molded receptacles project out over a top side of the base plate and form in the vicinity around the threaded bores molded cavities for torque-proof engagement of a molded part provided on the assembly machine.

4. The alpine anchor system according to claim 1, wherein the molded receptacles are countersunk into a surface of the base plate.

5. The alpine anchor system according to claim 1, wherein the threaded bores are disposed in threaded sleeves molded onto an underside of the base plate.

6. An assembly machine for anchoring alpine anchors in soil or rock, having a drive unit that drives via a reduction gear an assembly head having a spin chuck driven for rotation, the spin chuck being connectable in a positive-locking manner to a threaded rod, wherein the threaded rod is insertable via an insertion opening disposed on the assembly head into a driving bush driven for rotation in the assembly head, the driving bush being driven for rotation and driving the threaded rod for rotation, and further comprising at least one molded part disposed on the assembly machine fixed to a housing thereof, wherein the molded part is insertable in a positive-locking manner into a molded receptacle on a base plate of an alpine anchor, and wherein the assembly machine is supported by the molded receptacle in a free-standing manner.

7. A method for assembling an alpine anchor by means of an assembly machine carrying out the rotational drive of a threaded rod, the method comprising:
   engaging the threaded rod with a driving bush of the assembly machine,
   coupling a stationary part of the assembling machine in a torque-proof manner to a base plate of the alpine anchor,
   rotationally driving the threaded rod by the assembly machine through a threaded sleeve provided at the base plate into the soil or rock.

8. The method according to claim 7, further comprising, prior to the step of engaging, the steps of:
   inserting the threaded rod to be assembled into an insertion opening at a rear of an assembly head and
   guiding the threaded rod into a region of a driving bush disposed in the assembly head,
   wherein the step of engaging comprising bringing the threaded rod into engagement with the driving bush, further comprising, prior to the step of rotationally driving, the steps of:

bringing a molded part disposed on the front of the assembly machine into positive-locking engagement with a molded receptacle on the base plate, and starting a drive motor of a drive unit and driving the threaded rod by the assembly machine that is coupled in a torque-proof manner to the base plate through the threaded sleeve in the base plate into the soil or rock.

\* \* \* \* \*